(12) United States Patent
Mocek et al.

(10) Patent No.: US 7,313,547 B2
(45) Date of Patent: Dec. 25, 2007

(54) MANAGER LEVEL DEVICE/SERVICE ARBITRATOR AND METHODS

(75) Inventors: Darryl J. Mocek, San Jose, CA (US); Terrence Barr, Cupertino, CA (US); Behfar Razavi, San Jose, CA (US); Lisa M. Kelly, Cupertino, CA (US); William F. McWalter, Stirling (GB); Dianna L. Decristo, Venice, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 876 days.

(21) Appl. No.: 10/104,295

(22) Filed: Mar. 22, 2002

(65) Prior Publication Data

US 2003/0182233 A1  Sep. 25, 2003

(51) Int. Cl.
*G06F 17/60* (2006.01)

(52) U.S. Cl. .............................. 705/51; 705/1; 705/50; 455/428; 455/12.1

(58) Field of Classification Search ................ 455/428, 455/12.1; 705/56, 51, 50; 505/1
See application file for complete search history.

(56) References Cited

U.S. PATENT DOCUMENTS

| | | | | |
|---|---|---|---|---|
| 6,058,307 | A * | 5/2000 | Garner | 455/428 |
| 6,199,124 | B1 * | 3/2001 | Ramakrishnan et al. | 710/40 |
| 6,216,173 | B1 * | 4/2001 | Jones et al. | 715/705 |
| 6,477,665 | B1 * | 11/2002 | Bowman-Amuah | 714/39 |

FOREIGN PATENT DOCUMENTS

JP  1041767 A2 * 10/2000

OTHER PUBLICATIONS

Operating Systems, Design and implemenatation 2nd edition 1997, Tanenbaum et al.*
Operating systems design and implementation 2nd edition , Andrew S. Tannenbaum, 1997pp. 75-93.*

(Continued)

*Primary Examiner*—Andrew J. Fischer
*Assistant Examiner*—John Winter
(74) *Attorney, Agent, or Firm*—Martine Penilla & Gencarella, LLP

(57) ABSTRACT

A method for managing access to service entities (e.g., such as a devices, resources, and services, which are limited resources) is provided. The method includes requesting a priority level. In response, a priority object with an assigned priority level is returned. A service is then requested from a service manager, and the request includes data for carrying out the requested service and the priority object. The service manager is configured to identify at least one service entity that is required to carry out the requested service. Access is then requested to at least one service entity. A determination is made as to whether the at least one service entity is in-use. If at least one service entity is in-use, a further determination is made as to whether at least one service entity that is in-use has an assigned priority level that is higher than the assigned priority level, which is associated with a current request. The requester, such as a carlet, which has the higher assigned priority will gain control of the requested entity.

11 Claims, 11 Drawing Sheets

OTHER PUBLICATIONS

U.S. Appl. No. 10/104,267, filed Mar. 22, 2002, entitled "Adaptive Connection Routing Over Multiple Communication Channels".

U.S. Appl. No. 10/105,121, filed Mar. 22, 2002, entitled "Arbitration of Communication Channel Bandwidth".

U.S. Appl. No. 10/104,351, filed Mar. 22, 2002, entitled "System and Methods for Distributed Preference Data Services".

U.S. Appl. No. 10/104,297, filed Mar. 22, 2002, entitled "Asynchronous Protocol Framework".

U.S. Appl. No. 10/104,298, filed Mar. 22, 2002, entitled "Business-Model Agnostic Service Deployment Management Service".

U.S. Appl. No. 10/104,246, filed Mar. 22, 2002, entitled "Java Telematics System Preferences".

U.S. Appl. No. 10/104,243, filed Mar. 22, 2002, entitled "System and Method for Testing Telematics Software".

U.S. Appl. No. 10/104,860, filed Mar. 22, 2002, entitled "System and Method for Simulating an Input to a Telematics System".

U.S. Appl. No. 10/104,294, filed Mar. 22, 2002, entitled "Java Telemetrics Emulator".

U.S. Appl. No. 10/104,245, filed Mar. 22, 2002, entitled "Abstract User Interface Manager With Prioritization".

* cited by examiner

MANAGER LEVEL DEVICE/SERVICE ARBITRATOR AND METHODS

CROSS REFERENCE TO RELATED APPLICATIONS

This application is related to (1) U.S. patent application Ser. No. 10/104,267, filed Mar. 22, 2002, and entitled "Adaptive Connection Routing Over Multiple Communication Channels," (2) U.S. patent application Ser. No. 10/105,121, filed Mar. 22, 2002, and entitled "Arbitration of Communication Channel Bandwidth," (3) U.S. patent application Ser. No. 10/104,351, filed Mar. 22, 2002, and entitled "System and Method for Distributed Preference Data Services," now abandoned, (4) U.S. patent application Ser. No. 10/104,297, filed Mar. 22, 2002, and entitled "Asynchronous Protocol Framework," now U.S. Pat. No. 6,925,466, (5) U.S. patent application Ser. No. 10/104,298, filed Mar. 22, 2002, and entitled "Business-Model Agnostic Service Deployment Management Service," (6) U.S. patent application Ser. No. 10/104,246, filed Mar. 22, 2002, and entitled "Java Telematics System Preferences," now abandoned, (7) U.S. patent application Ser. No. 10/104,243, filed Mar. 22, 2002, and entitled "System and Method for Testing Telematics Software," now U.S. Pat. No. 7,146,307, (8) U.S. patent application Ser. No. 10/104,860, filed Mar. 22, 2002, and entitled "System and Method for Simulating an Input to a Telematics System," now U.S. Pat. No. 7,171,345, (9) U.S. patent application Ser. No. 10/104,294, filed Mar. 22, 2002, and entitled "Java Telematics Emulator," now U.S. Pat. No. 7,127,386, and (10) U.S. patent application Ser. No. 10/104,245, filed Mar. 22, 2002, and entitled "Abstract User Interface Manager with Prioritization," now U.S. Pat. No. 7,058,898, which are incorporated herein by reference.

BACKGROUND OF THE INVENTION

1. Field of the Invention

This invention relates generally to software for arbitrating use requests by applications to shared services or devices, and more specifically, methods for arbitrating priority to requesting applications of shared services, devices, and resources used on vehicles implementing a wireless telematics-type system.

2. Description of the Related Art

The electronic content and sophistication of automotive designs has grown markedly. Microprocessors are prevalent in a growing array of automotive entertainment, safety, and control functions. Consequently, this electronic content is playing an increasing role in the sales and revenues of the automakers. The features provided by the electronic content include audio systems, vehicle stability control, driver activated power train controls, adaptive cruise control, route mapping, collision warning systems, security systems, etc. The significant increase of the electronic content of land based vehicles has concomitantly occurred with the explosive growth of the Internet and the associated data driven applications supplied through mobile applications.

Telematics, a broad term that refers to vehicle-based wireless communication systems and information services, promises to combine vehicle safety, entertainment, and convenience features through wireless access to distributed networks, such as the Internet. Telematics offers the promise to move away from the hardware-centric model from audio and vehicle control systems that are built into devices that are custom designed for each vehicle, to infotainment delivered by plug-and-play hardware whose functionality can be upgraded through software loads or simple module replacement. Furthermore, new revenue streams will be opened up to automobile manufacturers and service providers through the products and services made available through telematics.

Since these infotainment systems integrate entertainment and information within a common envelope, the systems need to be highly integrated, open, and configurable. However, the electronic systems currently on the market are custom designed for the make, model, year and world region in which the vehicle is sold. Additionally, the electronic systems being used today are linked by proprietary busses having severely limited bandwidth that are inadequate for data-intensive services combining information entertainment and safety. The proprietary and customized systems require a developer to know the underlying software and hardware application program interfaces (APIs) in order to develop applications for future infotainment systems. However, numerous proprietary and customized systems are spread across the various makes and models of the vehicles in the marketplace and even within the same model from year to year. Thus, the heterogeneous nature of the various systems essentially eliminates any benefits of economies of scale since equipment and software must be tailored to each model permutation.

Another problem that can arise is when one or more device or service needs to be utilized by more then one calling application. For this example, assume that the calling application is a "caller." Accordingly, a problem arises when the second caller tries to access the same device or service. Currently, one of several things can happen: (1) the most often occurring scenario is that only the first caller gets their request handled. The second caller will therefore get an unavailable response to the request, (2) the two requests may be mixed. For example, if two requests to utilize the automobile speaker comes in, the audio data from both requests may get mixed together and played. As can be appreciated, neither of these scenario would be acceptable to a user.

In one specific example, assume an MP3 application is utilizing a media service to play an MP3 file. The media service utilizes the speakers to play the MP3 file. While the MP3 is being played, an oil leak in the vehicle causes the oil to be depleted in the engine. An alert service needs to call a speech service to alert the driver that the vehicle must pull over and stop the engine to prevent serious damage to the engine. As can be seen, it is more important that the driver be notified of the alert than having the MP3 file continue to play. In current systems, the speech service would possibly not get access to the audio driver and the engine would get damaged.

In view of the forgoing, there is a need for computer driven methods and systems that enable intelligent arbitration of service requests by applications desiring to access the same device, service, or resource.

SUMMARY OF THE INVENTION

In one embodiment, a method for managing access to service entities is provided. The method includes requesting a priority level. In response, a priority object with an assigned priority level is returned. A service is then requested from a service manager, and the request includes data for carrying out the requested service and the priority object. The service manager is configured to identify at least one service entity that is required to carry out the requested service. Access is then requested to at least one service entity. A determination is made as to whether at least one service entity is in-use. If the at least one service entity is in-use, a further determination is made as to whether the service entity that is in-use has an assigned priority level that is higher than the assigned priority level, which is associated with a current request. The requester, such as a carlet, which has the higher assigned priority will gain control of the requested entity, e.g., such as a device, resource, or service.

In another embodiment, a method for arbitrating access to service entities, where the service entities are limited resources, is provided. The method includes requesting a priority level to use a service entity. In response, a priority object is returned with an assigned priority level for using the service entity. A use request of the service entity is then made, the request includes data for carrying out the request and the priority object. A determination is then made as to whether the requested service entity is in-use. If the service entity is not in-use, access is granted to the service entity. If the service entity is in-use, the method includes arbitrating between the assigned priority level and a prior assigned priority level for the service entity that is in-use. Access is granted to the service entity if the assigned priority level is higher than the prior assigned priority level.

In yet another embodiment, a service arbitration system for granting access to service entities, where the service entities are limited resources, is disclosed. The system includes a calling application and a service manager of a particular type. A priority factory interface is implemented by the service manager, and the priority factory is specific to the particular type of the service manager. The priority factory is configured to assign a priority level to the calling application in a priority object. A service arbitrator is further provided. The service arbitrator is configured to grant and deny access to the calling application requesting use of a service entity. Granting and denying is arbitrated using the assigned priority level provided by the priority object.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION OF THE PREFERRED EMBODIMENTS

Figure 1:
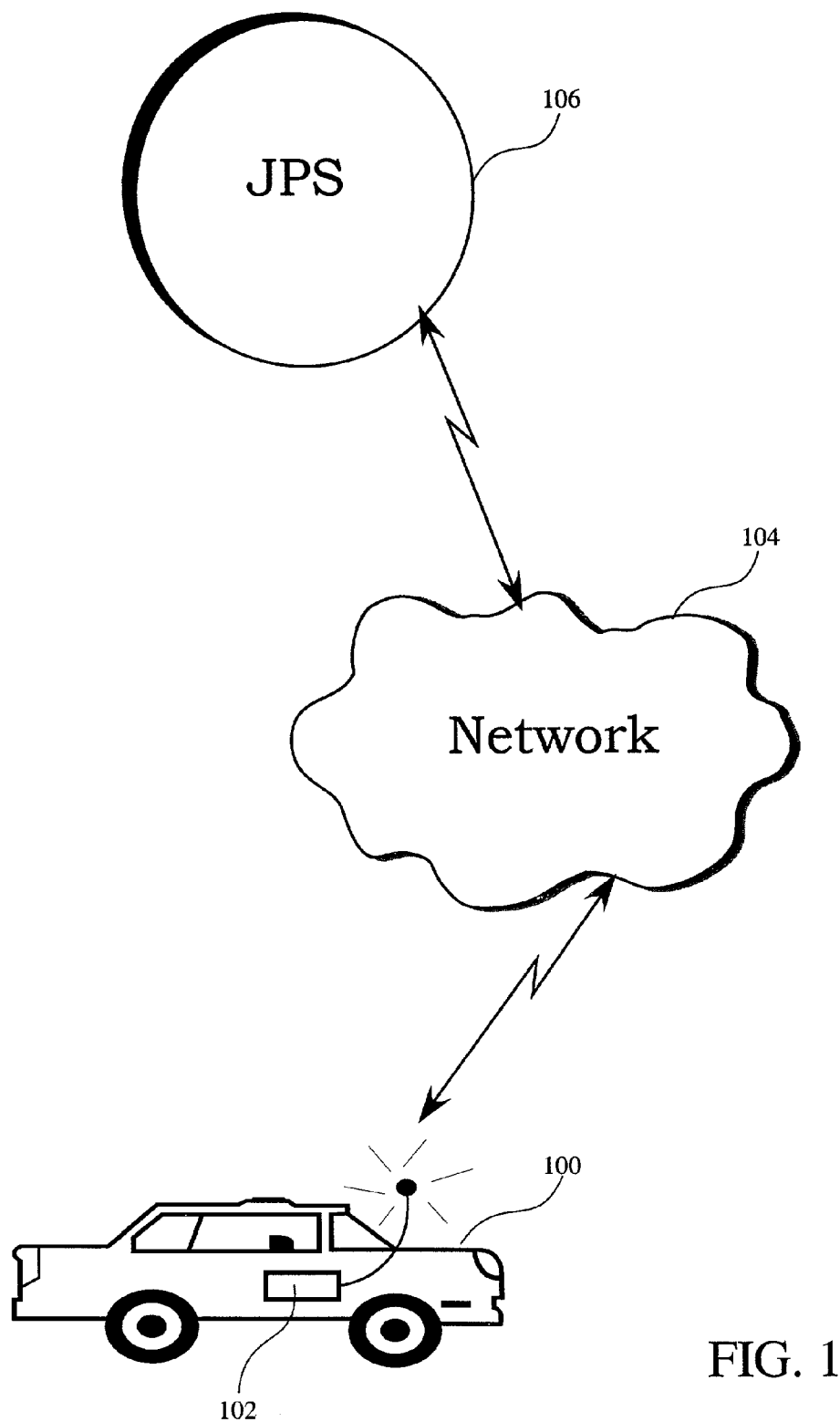
FIG. 1 is a high level schematic overview of an automotive telematics system in accordance with one embodiment of the invention.

An invention is disclosed for arbitrating the use of limited resources and services requested by service managers on behalf of applications (e.g., carlets). A service arbitrator is provided to manage access to limited resources and devices by using a priority scheme, which securely assigns priorities to requesting callers (e.g., carlets). As priority assignment is securely managed, a service arbitrator can safely grant access, deny access, and discontinue current access of the limited resources and devices to those callers having true relative priority. A limited resource is interchangeably referred to herein as a device, a resource, and/or a service. In general, limited resources can be viewed as service entities. For instance, service entities provide the services requested by the service managers, in response to requests from carlets, for example. It will be apparent, however, to one skilled in the art that the present invention may be practiced without some or all of these specific details. In other instances, well known process steps have not been described in detail in order not to unnecessarily obscure the present invention.

A connection is a logical entity to exchange data between two endpoints on behalf of a user application. A connection requires a communication channel to actually transmit and receive data. More than one communication channel may be available or feasible at a given time, depending on factors such as coverage. In the case of wireless connection, cell modems may only be available in more densely populated areas, and higher throughput connections may only be available at designated areas, such as, services stations. In the case where the wireless device is integrated into an automobile, the automobile may have relatively good reception around town using a cell modem. However, when the vehicle approaches a service station, for example, the service station may provide higher bandwidth coverage. That is, if a subscription was in place by the vehicle owner to obtain higher bandwidth upon entry into designated transmission areas, the system in accordance with the invention would be able to automatically disconnect from the cell modem and reconnect to a higher bandwidth connection, such as an 802.11b wireless LAN standard connection.

Each channel has certain properties associated with it such as bandwidth, reliability, and cost, which influence the decision (policy) on how to use a particular channel over time. In one embodiment, a method is provided to enable intelligent connection routing over a dynamically changing set of communication channels so that a given policy is best fulfilled. For example, one policy might state to always route a connection over the communication channel with the greatest bandwidth while another policy might favor the lowest cost per amount of data transmitted.

However, the channel that is most favorable under a given policy might not be available at all times. In this case, the connection must be routed over a different, less-favorable communication channel until the more-favorable channel becomes available again. Accordingly, optimization in communication connectivity is achieved by balancing channel properties vs. a pluggable policy.

In a preferred embodiment, the method of the present invention is independent of the protocols used and will be applicable to all types of networking stacks. The method further enables re-routing of a connection to happen transparently to the user application, e.g., no intervention by it is required and the data transmitted is unaffected. Although the policy may include input from the user application, this input does not mean the actual rerouting of the connection is less transparent to the application.

An embodiment of the invention enables the change in connection routing dynamically (e.g., at runtime), and the change takes place based on the set policy for a given connection. Accordingly, the method does not mandate a specific policy but allows the policy to be defined independently according to the needs of the specific setup and can then be plugged into the method at deployment time.

In another embodiment of the present invention, a method is provided that will enable transparent arbitration of bandwidth of one or more communication channels, among logical groups of connections, with a pluggable arbitration policy and dynamically updateable arbitration parameters. In one aspect, logical connections desiring communication over a given channel must be arbitrated so that the appropriate bandwidth of a channel's limited bandwidth is assigned to each connection according to assigned arbitration parameters. These arbitration parameters can change over time, so any change in these parameters, whether they give a connection more bandwidth or less, is dynamically and transparently assigned to each connection. In one aspect of the present invention, logical groups of connection will be set up, where each group has a set of arbitration parameters. As connections get added, they are added to a specific group using a grouping mechanism. Thus, all connections in a specific group share the bandwidth of the underlying channel. If a high priority connection gets added, it will be assigned to a group having arbitration parameters matching or closely matching the desired priority.

In one aspect of the present invention, the arbitration parameters of a group can be dynamically updated, resulting in a runtime change of the behavior of the arbitration. It should be noted that more than one group can be bound to a communication channel, and groups can be themselves grouped in supergroups, resulting in a hierarchical structure. There is exactly one root group bound to a communication channel and all subgroups share the bandwidth of that channel. Although emphasis is made, for purposes of example, to one communication channel, the methods of the present invention are applicable to more than one communication channel.

As will be explained in more detail below, the client side of a telematics system includes a telematics control unit (TCU) that ties into a vehicle system. In one embodiment, the TCU is associated with a user interface (UI) that provides a user with access to control options. It should be appreciated that the user can interact with the TCU through speech recognition, a mouse type device, touch pad or some other suitable mechanism which has a minimal impact on the driver's ability to drive. Of course, a passenger of the vehicle is not limited by the restrictions on the driver with respect to the interaction with the UI.

The TCU can tie into any of the control systems, safety systems, entertainment systems, information systems, etc., of the vehicle. It will be apparent to one skilled in the art that the client side stack of the TCU is utilized to access a vehicle interface component for accessing in-vehicle devices, such as the speedometer, revolutions per minute (rpm) indicator, oil pressure, tire pressure, etc. Thus, client side applications sitting in the TCU will allow for the functionality with respect to the vehicle systems as well as infotainment applications.

In one embodiment, the telematics system deploys Java technology. It should be appreciated that Java technology's platform-independence and superior security model provide a cross-platform solution for the heterogeneous systems of a vehicle while maintaining a security architecture protecting against viruses and unauthorized access. Thus, the content or service provider is insulated against the myriad of car platforms while vehicle manufacturers are protected against hacker threats. In addition, Java application program interfaces (APIs) are available to support telematics mediums, such as speech recognition through Java Speech API (JSAPI), media delivery through Java Media Framework (JMF) and wireless telephony through Wireless telephony communications APIs (WTCA), etc.

FIG. 1 is a high level schematic overview of an automotive telematics system in accordance with one embodiment of the invention. A client/server architecture relying on standards and principles of modular design allows for functionality of the telematics system to be delivered to the customer through wireless access. The server side includes Java provisioning server (JPS) 106 in communication with network 104. For a detailed description of JPS 106, reference may be made to U.S. patent application Ser. No. 10/104,397, entitled "Asynchronous Protocol Framework," and having inventors Peter Strarup Jensen, Pavel S. Veselov, Shivakumar S. Govindarajapuram, and Shahiriar Vaghar, assigned to the assignee of the present application, and which is hereby incorporated by reference.

In one embodiment, the client side includes telematics control unit (TCU) 102 contained within a land based vehicle 100. Of course, the TCU's implementation is not limited to land based vehicles, and is equally applicable to boats, planes, hovercraft, space shuttles, etc., which are all recipients of the technology defined herein. TCU 102 is enabled to communicate with network 104 through wireless access. Of course, network 104 can be any distributed network such as the Internet and the wireless access protocol (WAP) can be any suitable protocol for providing sufficient bandwidth for TCU 102 to communicate with the network. It should be appreciated that the client/server architecture of FIG. 1 allows for the evolution from hard wired, self contained components to platform based offerings relying on software and upgrades. Thus, a service provider controlling JPS 106 can deliver an unbundled, open end-to-end solution enabling plug and play applications. For example, the service can be a tier-based service similar to home satellite and cable services. It will be apparent to one skilled in the art that an open platform, such as frameworks based on Java technology, enables a developer to create executable applications without regard to the underlying hardware or operating system.

Figure 2:
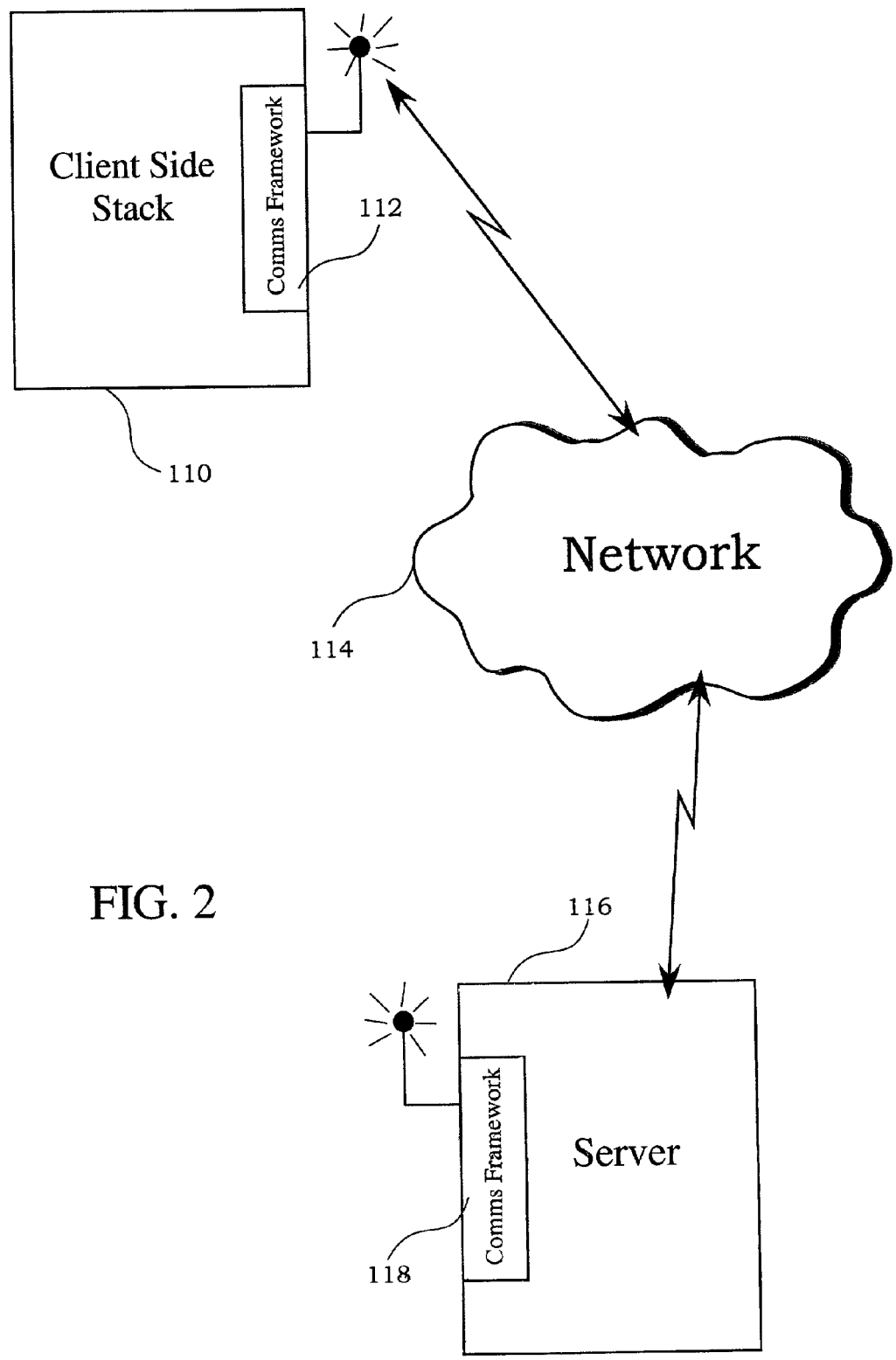
FIG. 2 is a schematic diagram of a telematics client communicating through a wireless network with a telematics server in accordance with one embodiment of the invention.

FIG. 2 is a schematic diagram of a telematics client communicating through a wireless network with a telematics server in accordance with one embodiment of the invention. Client side stack 110 includes the necessary layers for a client application, also referred to as a manager or a carlet, to be executed to provide functionality. As will be explained further below, the carlet has access to each layer of the client side stack 110. Included in client side stack 110 is client communication framework 112. Client communication framework 112 enables communication between the client side stack 110 and an application on server 116 through network 114.

It should be appreciated that server 116 is not limited to a wireless connection. For example, server 116 can be hard-wired into network 114. One skilled in the art will appreciate that where server 116 communicates through a wireless connection with network 114, the communication proceeds through server communication framework 118. With respect to an embodiment where server 116 is hard-wired to network 114, the server can communicate with network 114 through a network portal (e.g., the Internet) rather than server communication framework 118. Additionally, network 114 can be any suitable distributed network, such as the Internet, a local area network (LAN), metropolitan area network (MAN), wide area network (WAN), etc.

Figure 3:
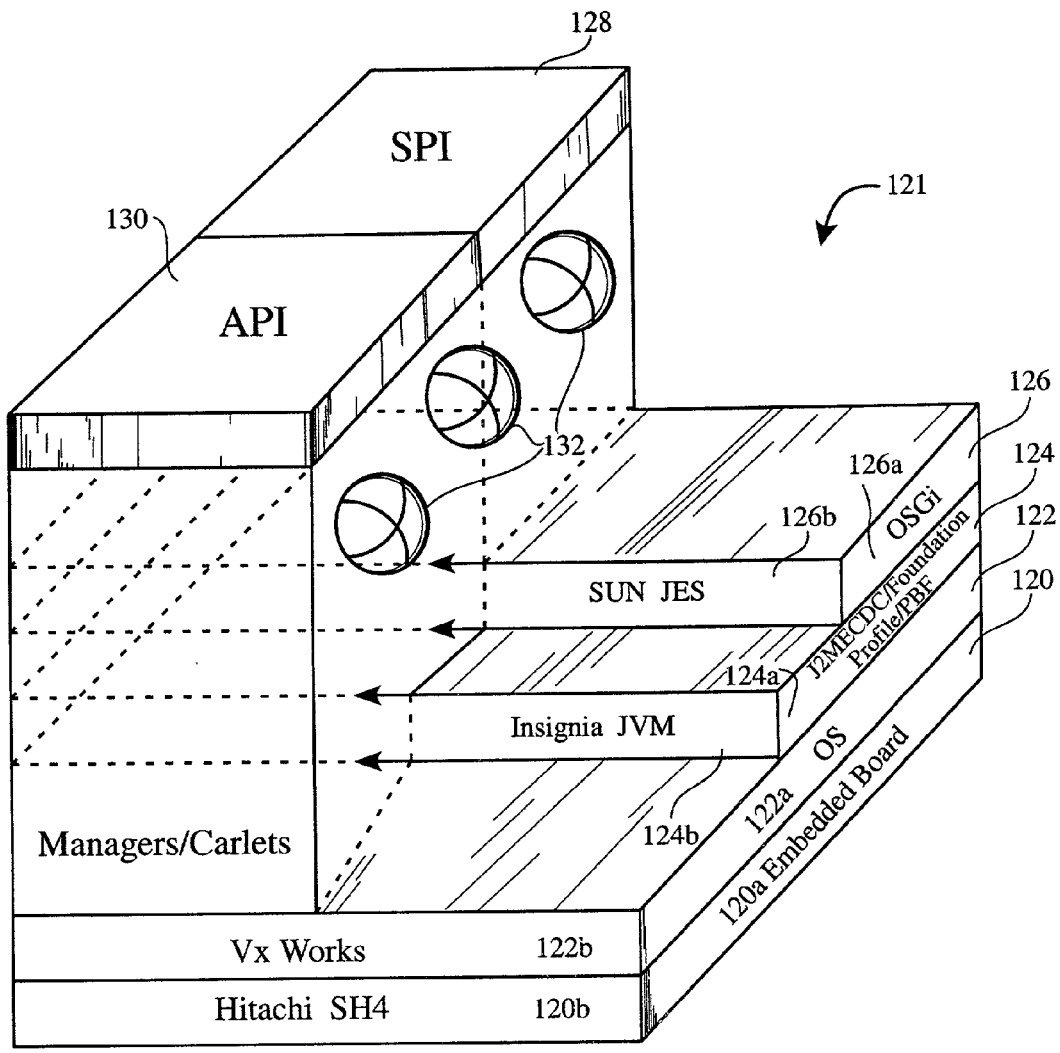
FIG. 3 is a three dimensional pictorial representation of a telematics client implementation of the client side stack of FIG. 2 in accordance with one embodiment of the invention.

FIG. 3 is a three dimensional pictorial representation of a telematics client implementation of the client side stack of FIG. 2 in accordance with one embodiment of the invention. Client side implementation 121 includes hardware layer 120 of the client includes an embedded board containing a telematics control unit (TCU). As mentioned with reference to FIG. 1, the TCU is incorporated into a land based vehicle. In one embodiment, the TCU is in communication with the electronic components of a vehicle through a vehicle bus or other means. These components include the measurement of vehicle operating and safety parameters, such as tire pressure, speed, oil pressure, engine temperature, etc., as well as information and entertainment components, such as audio system settings, internet access, environmental control within the cabin of the vehicle, seat positions, etc. One skilled in the art will appreciate that the telematics control unit is capable of integrating the functionality of various handheld information and entertainment (infotainment) devices, such as mobile phones, personal digital assistants (PDA), MP3 players, etc.

Still referring to FIG. 3, operating system layer 122 sits above hardware layer 120. Java virtual machine (JVM) layer 124 sits on top of operating system (OS) layer 122 and open services gateway initiative (OSGI) layer 126 sits on top of the JVM layer. It should be appreciated that the standard for JVM layer 124 includes Java 2 Platform Micro Edition (J2ME), Connected Device Configuration (CDC), Foundation Profile, Personal Profile, or Personal Basis Profile. One skilled in the art will appreciate that J2ME Foundation Profile is a set of APIs meant for applications running on small devices that have some type of network connection, while J2ME Personal Profile provides the J2ME environment for those devices with a need for a high degree of Internet connectivity and web fidelity.

The exemplary standards for each of the layers of the stack are provided on the right side of client side reference implementation 121. In particular, OSGI 126a, J2ME 124a, OS 122a, and embedded board 120a are standards and to the left of the standards are examples of actual products that implement the standards. For example, OSGI 126a standard is implemented by Sun's Java Embedded Server (JES) 2.1 126b, J2ME 124a standard is implemented by Insignia's Virtual Machine 124b, OS 122a is implemented by Wind River's VxWorks real time operating system 122b, and embedded board 120a is an embedded personal computer based board such as Hitachi's SH4. It should be appreciated that the actual products are exemplary only and not meant to be limiting as any suitable product implementing the standards can be utilized.

Carlets 132 of FIG. 3, have access to each layer above and including OS layer 122. Application program interface (API) layer 130 is the layer that carlets use to communicate with the JTC. Service provider interface (SPI) layer 128 is a private interface that managers have among each other. One skilled in the art will appreciate OSGI layer 126 provides a framework upon which applications can run. Additional functionality over and above the JVM, such as lifecycle management, is provided by OSGI layer 126. It should be appreciated that the open services gateway initiative is a cross-industry working group defining a set of open APIs for a service gateway for a telematics system. These APIs consist of a set of core framework APIs. In order to deploy services and their implementations, OSGi defines a packaging unit called a service bundle. A service bundle is a Java Archive (JAR) file containing a set of service definitions along with their corresponding implementation. Both infrastructure services and carlets are deployed as service bundles. Some of the functionality for arbitrating, controlling and managing devices and resources, e.g., speakers cell phones, etc., is provided by OSGI layer 126. However, one skilled in the art will appreciate that separate arbitration services may also be required.

As defined further below, a carlet is a Java™ application. For each function or task to be processed on the client side or between the client and server sides, a carlet is invoked to manage the operation.

Figure 4:
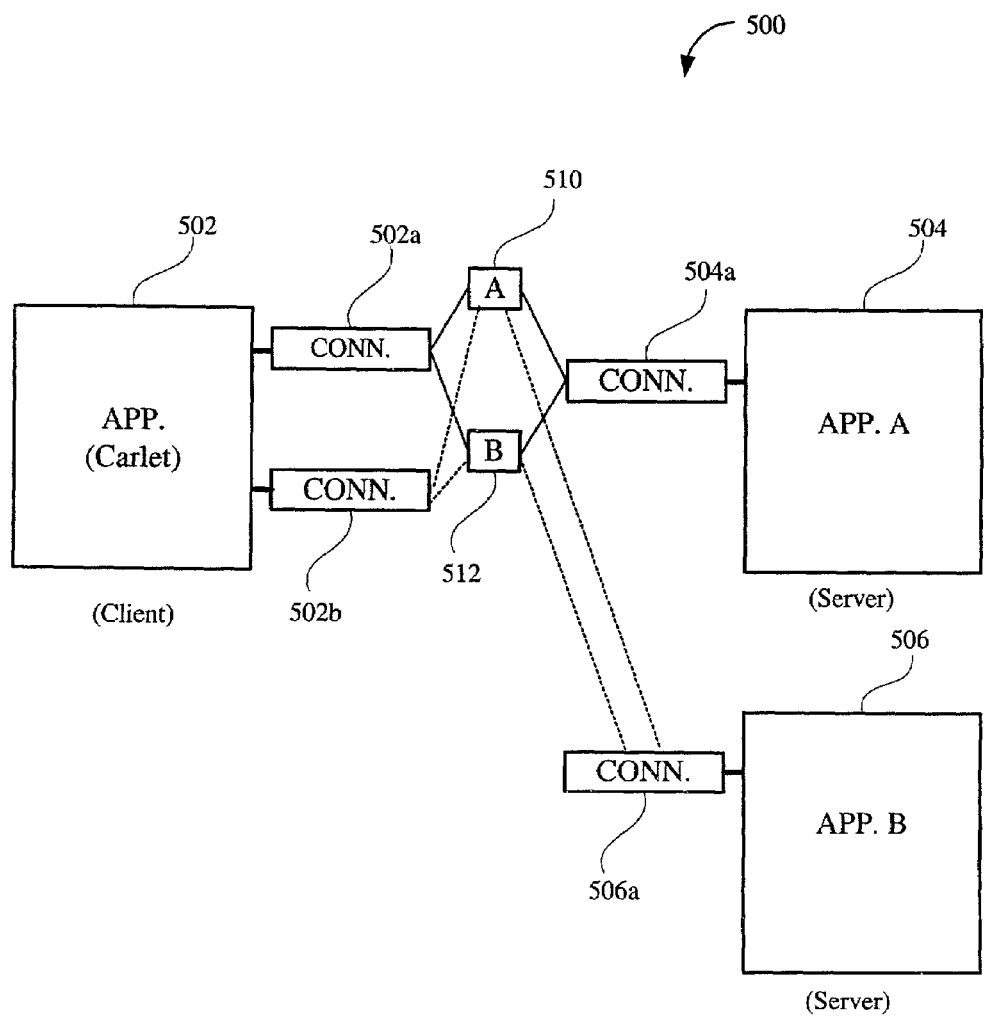
FIG. 4 illustrates exemplary logical connections between a client application and server applications over different channels.

FIG. 4 shows a block diagram of a communication system 500 in which a client side application 502 communicates with applications 504 and 506 of a server side. As discussed above, application 502 may be a carlet application, and application A (APP.A) and application B (APP.B) may be applications running on a server side of a system, such as the telematics system described above. Connections can be established between application 502 and application A 504 over a logical connection established between connection (CONN.) 502a and connection (CONN.) 504a. The logical connection between connection 502a and connection 504a is shown established over a physical channel A 510.

The same logical connection can be established between application 502 and application A 504 over a physical channel B 512. Physical channel A 510, in a wireless environment, may be a cell modem connection. Physical channel B 512 may be, for example, a connection utilizing standard 802.11b. As is well known, the IEEE 802.11b specification defines the protocol for wireless transmission of approximately 11 Mbps of raw data at distances from several dozen to several hundred feet over the 2.4 GHz unlicensed band. Generally speaking, 802.11b is an extension of Ethernet to wireless communication, and is primarily used for TCP/IP, but can also handle other forms of networking traffic. Thus, a wireless connection over standard 802.11b is substantially faster than a connection over a cell modem (e.g., providing a greater bandwidth).

Another channel may provide Bluetooth communication. Bluetooth is the name given to a technology standard using short-range radio links, intended to replace the cable(s) connecting portable and/or fixed electronic devices. This technology offers wireless access to LANs, PSTN, the mobile phone network and the internet for a host of home appliances, portable handheld devices, and vehicle telematics devices. Of course, the type of wireless connection is not important, as is the ability to seamlessly and adaptively switch between available channels, while making it transparent to the user application.

Referring to FIG. 4, a connection can also be established between logical connections 502b and 504a to application A 504 over any one of physical channels A 510, physical channel B 512, physical channel N, etc. The same logic applies when a connection is established between application 502 on the client side with application B 506 on the server side. In one embodiment, application 502 will be capable of selecting the most appropriate channel to achieve the quality of service desired for communication between the client and the server. This is true even though channels A 510 and channel B 512 may utilize different network level communication protocols, thus achieving true network protocol independence.

To achieve the foregoing, a communication framework API is provided to enable communication between the client application (carlet) 502 and an application on the server side over a logical connection by selecting the most appropriate, or most efficient communication channel as dictated by a policy. In the communications framework, logic is provided to enable selection between available channels to satisfy a policy set by the user application to achieve the communication quality of service (QoS) desired for a particular application. For instance, if the carlet application 502 were an MP3 media player, and downloading of MP3 music files is an object of the carlet application 502, then the policy may dictate that communication may only occur over a given type of channel, such as an 802.11b channel. If the desired channel were not available, then no connection would be initiated. In another embodiment, upon detecting the availability of the 802.11 channel, the connection would be established for the carlet.

Figure 5:
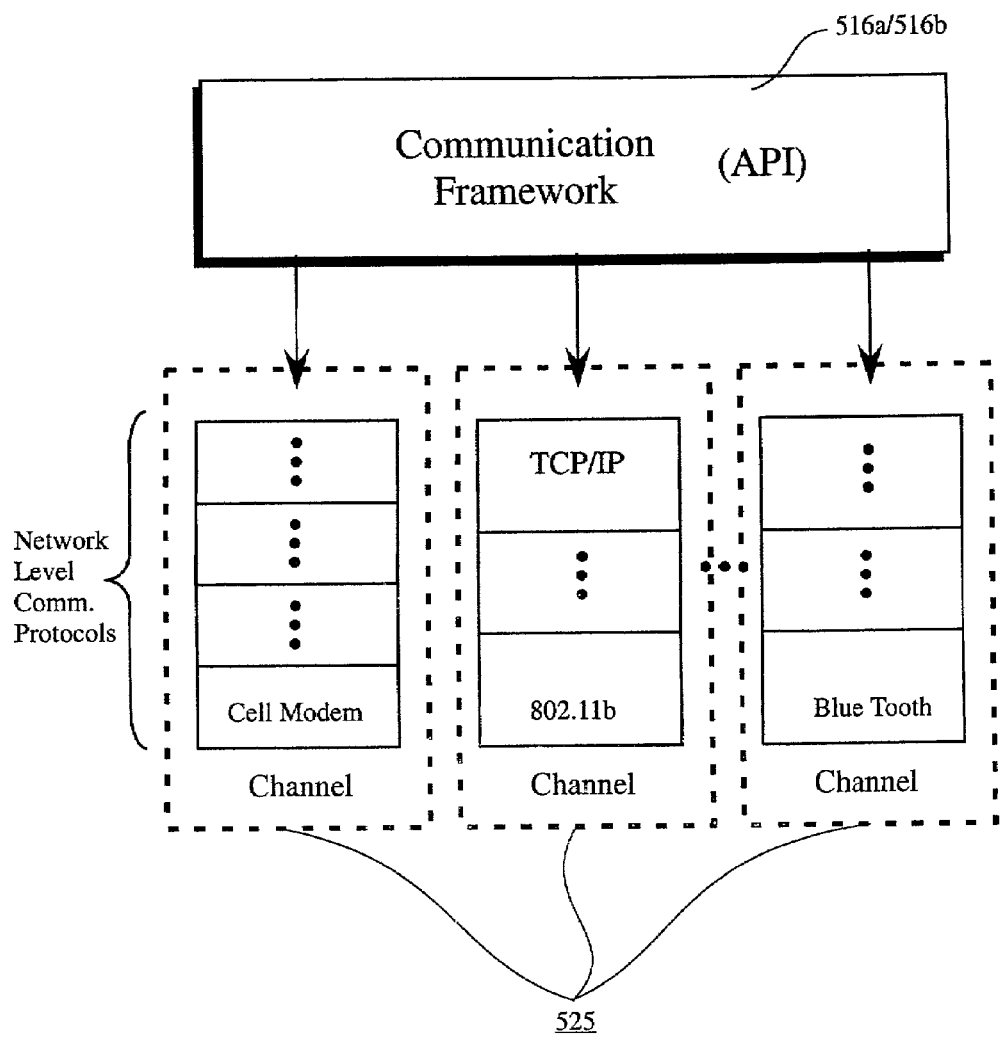
FIG. 5 is a block diagram showing the communication framework API capable of interfacing with disparate communication channels, in accordance with one embodiment of the present invention.

FIG. 5 illustrates a more detailed diagram of the communication's framework (API) 516a/516b. The communication's framework is designed to enable selection between different channels 525 having different network level communication protocols. Accordingly, the communication framework 516 is designed to enable intelligent selection of a given channel to achieve the quality of service desired by the user application (or as defined in the policy). FIG. 5 is simply provided to illustrate how the communications framework (API) 516a/516b is truly independent of the underlying networking protocol. As such, a connection over any one channel will be transparent to the carlet on the client side and the application on the server side. Although TCP/IP is illustrated as an example, it should be understood that the preferred embodiments of the present invention may use any protocol implementation.

Figure 6:
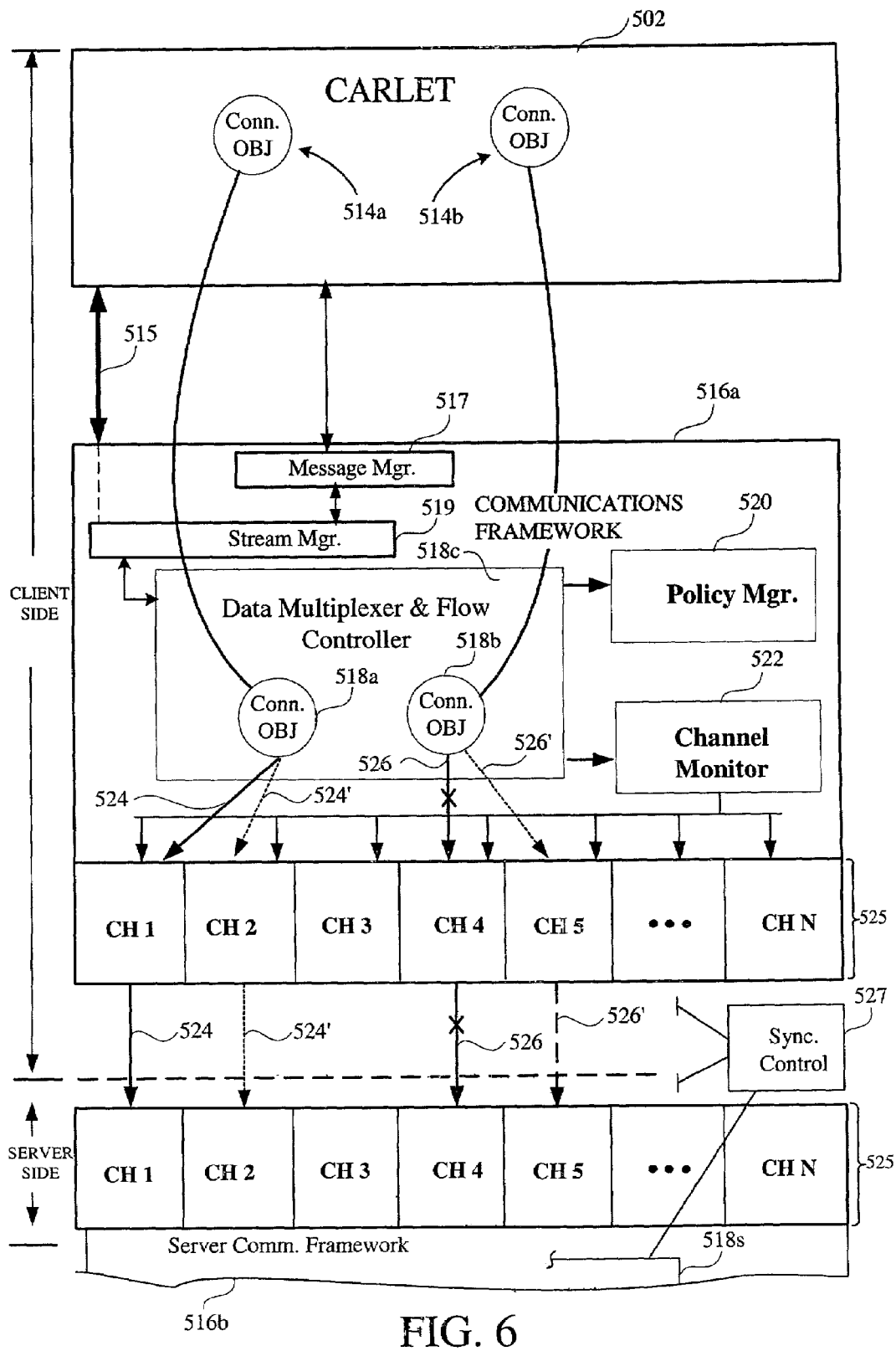
FIG. 6 illustrates an exemplary connection between one carlet (client application) and a server using the communications framework of the present invention.

FIG. 6 illustrates communication between a carlet application 502 and the communications framework 516a on the client side. For purposes of simplicity, the detailed components of the communications framework 516a is only shown from the perspective of the client side, although it should be understood that the server side has a similar communication framework 516b to establish and enable synchronous communication between the client side (e.g., a telematics control unit on a vehicle) and the server side (e.g., a Java telematics server). The telematics java provisioning server is charged with communicating with any number of clients. Such clients may be from any number of vehicles, makes, models, etc, while the client side is specific to a particular vehicle and TCU implementation.

The communications framework 516a will include a message manager 517, a stream manager 519, a data multiplexer and flow controller 518c (i.e., to function as a data pump), a policy manager 520, a channel monitor 522, and an interface to the various physical channels available to the communications framework of the client side. A synchronization control 527 is provided to interface between the client side and the server side. Specifically, the synchronization control 527 will enable communication between the data multiplexer and flow controller 518c of the client side, and the data multiplexer and flow controller 518s of the server side.

In operation, when a particular carlet application 502 is requested, the carlet will communicate 515 with the stream manager 519 and request that a connection be established. In the request, the carlet, in one embodiment, will provide properties detailing what type of connection is needed to satisfy the carlet's bandwidth requirements. As noted above, if the carlet is an MP3 carlet, the properties may designate a particular minimum transfer rate. In response, the stream manager 519 will request a connection object (Conn. OBJ) 518a from the data multiplexer and flow controller 518c. If a channel satisfying the desired bandwidth is available, the data multiplexer and flow controller 518c will return a connection object (Conn. OBJ) 514a back to the carlet. The message manager 517 provides message-based communication, where messages are discrete entities of data (as opposed to a continuous stream of data in a stream connection). In general, messages can be sent and received in both directions, in a synchronous and/or asynchronous manner. Actual transmission of messages might occur over a stream-oriented channel or a message-oriented channel (such as SMS, etc).

Accordingly, a communication link will be established between the carlet application 502 via the connection objects 514a and 518a of the data multiplexer and flow controller 518c. In one embodiment, the connection object 518a of the data multiplexer and flow controller 518c has the ability to switch between channels 525 that are available to the communications framework 516a of the client side. For instance, the data multiplexer and flow controller connection object 518a may initially establish a connection 524 to a channel 1 (CH 1). Connection 524 will thus communicate with a complementary channel 1 (CH 1) of the server side. The policy manager 520, is preferably a pluggable policy that can be custom tailored for the particular application or based on user specifications. For instance, the policy manager may contain code that will enable selection of different channels depending upon availability, the type of communication desired, bandwidth requirements for a given data transfer or transfers, payment of a bandwidth fee, subscription level, etc.

Assume in one example that the connection objects 514a and 518a have been established and are enabling data flow over connection 524 through channel 1. At some point in time, possibly when the client (e.g., a vehicle with a telematics control unit) enters a zone of higher bandwidth (e.g., such as a gas station with high wireless bandwidth services), channel 2 (CH 2) will become available. Its availability is detected by the channel monitor 522 of the communications framework 516a. If channel 2 is more desirable than channel 1, based on the policy set by the policy manager 520, the connection object 518a will initiate a switch to channel 2.

The switch to channel 2 will then be synchronized using the synchronization control 527, such that data being transferred between the client side and the server side achieve synchronization (i.e., thus preventing data loss during the switch). For instance, the data flow over connection 524 may be stopped causing a backup at the carlet application side. Any data still in the process of being transferred over channel 1 would be allowed to complete before allowing the connection object 518a to switch to channel 2. This synchronization between the client side and server side will enable channel switching, while preventing loss of data. Accordingly, once the connection object 518a has established synchronization between the client side and the server side, and the connection object 518a has switched from channel 1 to channel 2, the data flow is allowed to continue over connection objects 514a and 518a through channel 2. If any data was backed up at the client side, that data is then allowed to flow through channel 2.

This process would then continue depending upon the policy set by the policy manager, and based upon the continual monitoring of each of the available channels by the channel monitor 522. For instance, a carlet may have more than one connection open as illustrated by connection object 514b, and connection object 518b of data multiplexer and flow controller 518c.

In certain circumstances, a connection object 518b may lose a connection 526 due to a break in the transmission capability of a particular channel (e.g., by going out of range of a current wireless network). If this were to occur, the detection of the unavailability of channel 4 (CH 4), would be identified by the channel monitor 522. The connection object 518b would then determine whether the channel that became unavailable was actually in use. In one example, the channel may not actually be in use, but its loss in availability would still be detected, thus preventing its selection. In another example, it is assumed that channel 4 was in use. In such a case, data may have been lost due to the sudden drop in communication. When this occurs, the connection object 518b would communicate with a connection object 514b of the carlet to determine if data was in fact lost. If data was lost, a request would be made to the carlet for the lost data in case the carlet was sending data to the server, or a request would be made to the server for the lost data in case the server was sending data to the carlet.

The policy manager would then be queried to determine which one of the remaining channels being monitored by the channel monitor 522 would be most preferable to switch to, to continue the connection established between connection objects 514b and 518b. In this example, the connection object 518b would switch to connection 526' over channel 5 (CH 5), which may be a slower connection, although, the connection would be transparently re-established to enable continual data transmission. To complete the switch, the synchronization control 527 would work in conjunction with the client side and the server side to ensure that data being communicated between each of the data multiplexer and flow controllers 518c and 518s is synchronized, and any dropped data is retransmitted. Because the channel monitor 522 continues to monitor each of the channels, if the more preferred channel were to come back on, a transparent switch would again occur, as discussed with reference to the channel switch between connections 524 and 524'. Although the message manager is shown utilizing the stream manager, other implementations may have a message manager utilizing its own protocol, and in some cases, its own hardware.

Figure 7:
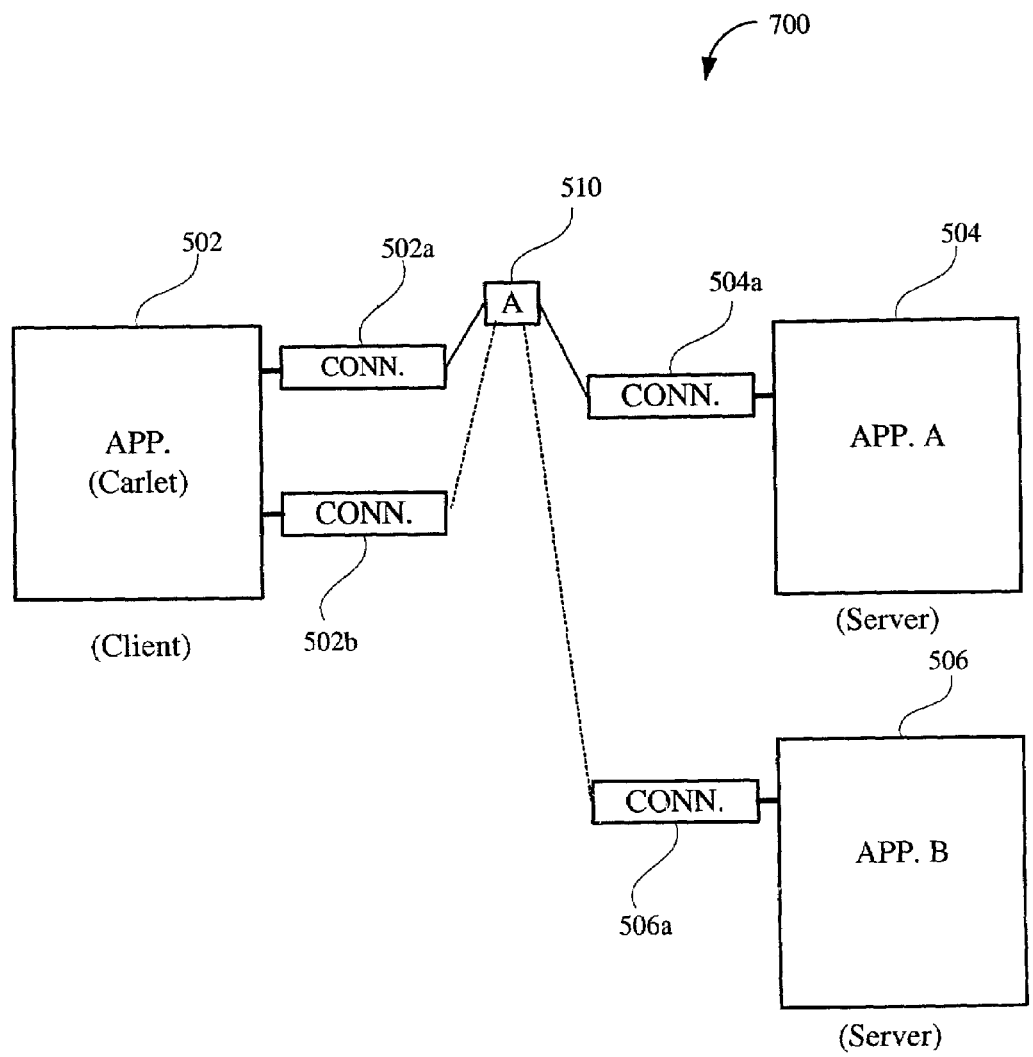
FIG. 7 is a connection diagram, illustrating the sharing of a channel A, in accordance with one embodiment of the present invention.

FIG. 7 is a connection diagram 700, illustrating the sharing of a channel A 510, in accordance with one embodiment of the present invention. Carlet 502 is shown having two separate connections (e.g., logical connections) 502a and 502b, each of which is transmitting over channel A. Connection 502a is linked with connection 504a to establish a logical connection. Likewise, connection 502b is linked with connection 504b to establish another logical connection. In accordance with one embodiment of the present invention, each logical connection is enabled with a particular bandwidth or priority so that each connection can share channel A 510, and connections having more priority are given preference over lower priority connections. This intelligent bandwidth sharing is required as channel A 510 has limited bandwidth, and each connection is given a portion of that bandwidth depending on arbitration parameters set for each connection. As discussed below, a grouping mechanism is used to group connection together with other connections having the same assigned arbitration parameters. Such arbitration parameters can be updated, thus allowing dynamic changes to the bandwidth assigned to particular connections.

Figure 8:
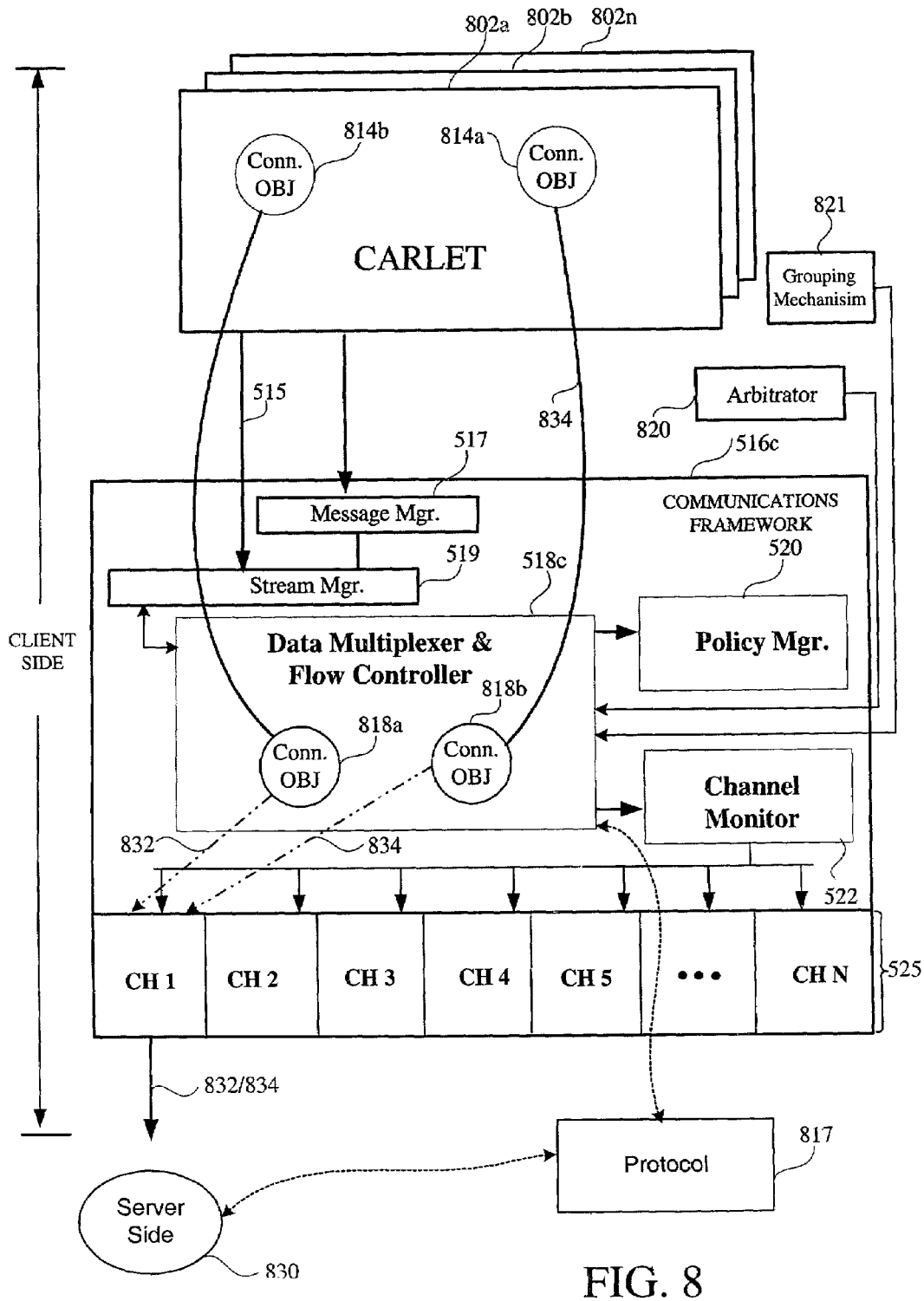
FIG. 8 illustrates another diagram of the client side in which carlets communicate with a communications framework, in accordance with one embodiment of the present invention.

FIG. 8 illustrates another diagram of the client side in which carlets 802 communicate with a communications framework 516c, in accordance with one embodiment of the present invention. As shown, a plurality of carlets 802 can communicate with the communications framework 516c of the client side to establish communication with a server side 830. For purposes of illustration, an example will be made with reference to carlet 802a, although a number of carlets such as carlets 802b-802n can also perform the same communication with the communications framework 516c. For instance, carlet 802a may request from the stream manager 519 that a connection be established for transmitting data to the server side 830.

The stream manager 519 will then communicate with the data multiplexer and flow controller 518c to request a connection. The connection 818a is then provided back to the carlet 802a to establish connection 832. In the same manner, a connection 818b is established between the carlet 802a and the communications framework 516c. Connection object 818b will thus communicate via connection 834. Connections 832 and 834 were both selected for channel 1 (CH 1). For instance, channel 1 may be a cell modem connection that is available to the carlet 802a for communication with a server side 830. In one example, channel 1 may be the only channel that is available for communication from the client side to the server side and therefore, both connection objects 818a and 818b will utilize the same channel 1.

In one embodiment, an arbitrator 820 will be in communication with the data multiplexer and flow controller 518c. The arbitrator 820 is charged with assigning, updating, and managing, for each connection object desiring communication over a particular channel, its associated bandwidth (e.g., arbitration parameters), or allotted communication bandwidth with the server side. A grouping mechanism 821 will, in one embodiment, assign each logical connection to a group that has particular arbitration parameters. The arbitration parameters will set the amount of bandwidth that may be allowed for connections that are resident or assigned to a particular group. For example, the arbitration parameters may be based upon priority, minimum bandwidth, minimum average bandwidth, or any other scheme that may be available to allocate the limited bandwidth of a particular channel among a number of connections desiring to transmit over the same communication channel.

As mentioned above, the data multiplexer and flow controller 518c will also be in communication with the policy manager 520, and the channel monitor 522. The channel monitor 522 may have indicated that the only channel that is available for transmission is channel 1. The policy manager 520 will thus allow or disallow connections over channel 1, depending upon the policy set for a particular connection between a carlet 802a and the server side 830. A protocol 817 is shown in communication with the data multiplexer and flow controller 518c, and the server side 830. The protocol 817 is charged with ensuring that both the client side and the server side are synchronized so that each will receive the same data in accordance with the arbitration parameter set for the connection objects.

The grouping mechanism 821 is configured to link or assign a particular connection to the arbitration parameters set for the particular group. In each particular group, the arbitration parameters can be set to provide connections that are part of that particular group with a given bandwidth policy. At any time, the arbitration parameters of a particular group can be updated so that connections that are part of a particular group can be processed with new arbitration parameters. For instance, a particular group may be given low priority because the carlet may simply be communicating music files between the server side and client side. At a later point in time, the user may want to give music downloading higher bandwidth, if a higher subscription fee is paid, for example. To accomplish this, the group for which the connection object is part of may be given new arbitration parameters to increase the bandwidth. During the next transmission, the new arbitration parameters will be used to allocate the bandwidth to the connection of the group which has now had an update.

As mentioned above, the data multiplexer and flow controller 518c will operate in time slices and will multiplex data from the logical connections to the channel in a packetized fashion using the protocol 817. In this manner, both the client side and the server side can keep track of each of the packetized transfers of data between the client and the server. If packets are dropped, packets can be resent. Exemplary protocols may be, for example, IP, TCP/IP, etc. The amount of data sent for a certain connection in a certain time slice may be determined by the group the connection is a member of, including the arbitration parameters set by the arbitrator 820, and the policy set by the policy manager 520.

Accordingly, arbitration will occur on an ongoing basis (e.g., every time slice), so that any change in the arbitration parameters for a certain connection will have an effect on the arbitration in the next time slice for that connection. Therefore, updates to the arbitration parameters will be dynamically updated in runtime so that data transfers for each of the connection objects can be managed depending upon changes in bandwidth need, priority, or the like.

Figure 9:
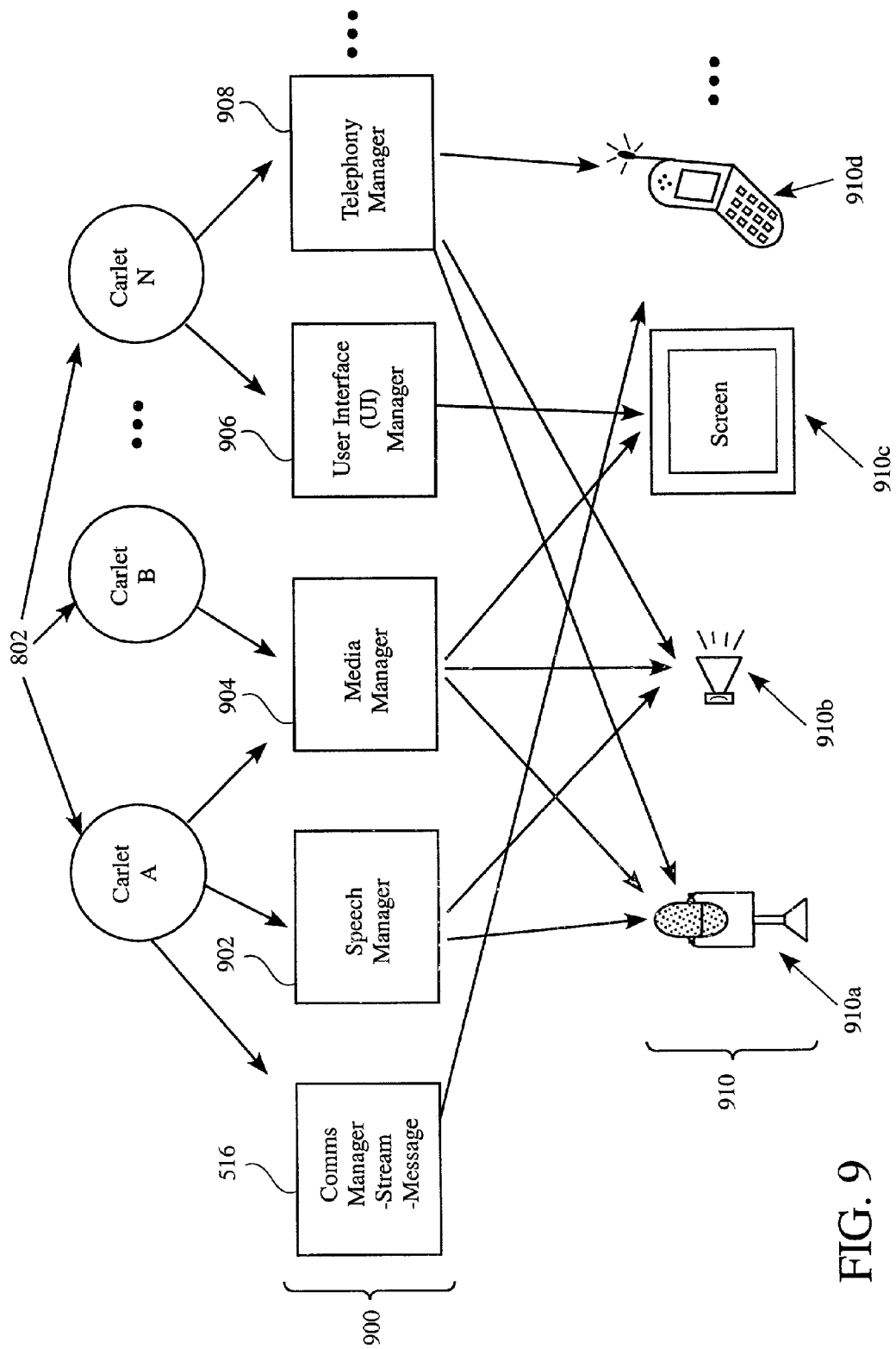
FIG. 9 shows a block diagram of a plurality of carlets A . . . N, in communication with a number of service managers of a client side system, in accordance with one embodiment of the present invention.

FIG. 9 shows a block diagram of a plurality of carlets A . . . N 802 in communication with a number of service managers of a client side system, in accordance with one embodiment of the present invention. The managers 900 include communications manager 516 and its components, stream manager 519 and message manager 517, speech manager 902, media manager 904, user interface (UI) manager 906, and telephony manager 908. It should be understood, that the managers shown here are only for purposes of example, and any number of managers may be added or deleted depending on the desired services to be managed. Each of these managers 900 will be capable of accessing a number of services, devices, or resources in response to carlet requests (i.e., caller requests). As shown, devices 910 include, for example, microphone 910a, speaker 910b, screen 910c, cell modem phone 910d, and many others. Examples of other resources include memory, disk space, threads, etc.

These devices 910 are simply an illustration of the type devices that can be shared amongst a number of managers requiring their services in response to requests of carlets 802. For example, carlet A 802 may request access to each of the speech manager 902, media manager 904, and the communications manager 516. Carlet B 802 may simply request services from the media manager 904, and carlet N 802 can request services from user interface manager 906 and telephony manager 908. As mentioned above, if the use of these devices 910 is not managed appropriately, there will be conflicts when the managers may be requesting the same limited resource of, for example, the speaker 910b at the same time.

As will be discussed below, service arbitrator code is provided to make decisions as to which caller (i.e., carlet) can use a limited resource or device, which caller is denied use (e.g., because it is already being used by a caller which is more important), and which caller must give up use because a new caller is more important. In one implementation, the service arbitrator is a separate piece of code from the services which need to be arbitrated.

For the Service Arbitrator to determine which caller should have access to the resource, priority must be defined. In one embodiment, a priority class is an interface that is expected to be defined as concrete implementations of the priority interface. A priority represents what priority level a caller has for a given resource or service. To distinguish a priority from one service from another (i.e., to prevent a caller from requesting a high priority from an unimportant service and passing it to another, more important service), each concrete priority implementation is of a specific type for the service upon which it is to be used. As will be illustrated below, the media manager 904 will have a media priority factory 930a and the speech manager will have a speech priority factory 930b, and so on.

Figure 10:
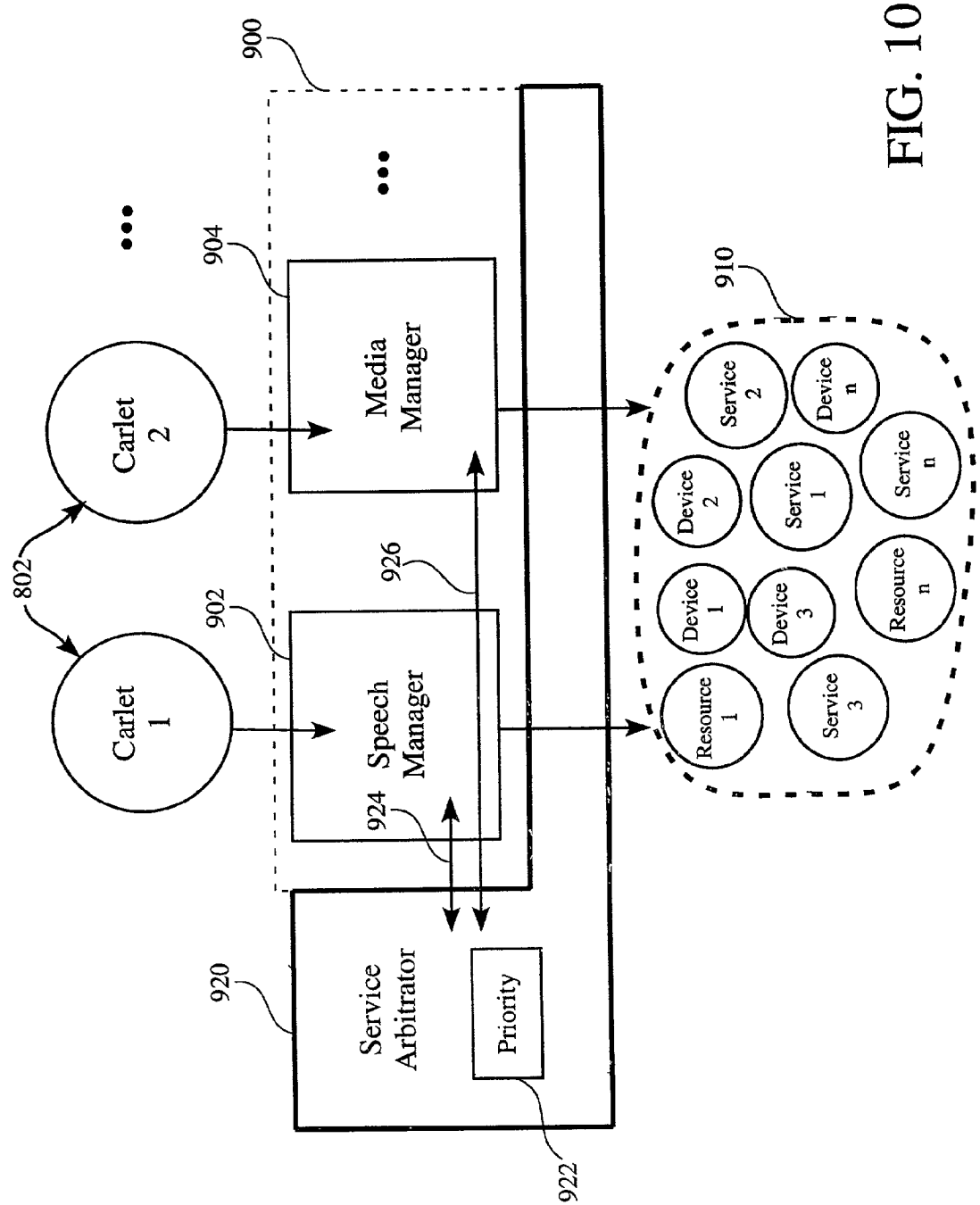
FIG. 10 illustrates carlets 1 and 2 being in communication with a speech manager and a media manager, respectively.

FIG. 10 illustrates carlets 1 and 2 802 being in communication with speech manager 902 and media manager 904, respectively. The manager layer 900 is also in communication with a service arbitrator 920 that is configured to manage priorities 922 of the various carlets desiring access to the various devices, services, or resources. Service arbitrator 920 will be charged with managing requests from various carlets through managers 900 to the limited resources 910. In this embodiment, the service arbitrator 920 operates as separate code, which is in communication with each of the separate managers 900.

As mentioned above, the limited resources 910 are interchangeably referred to as devices, resources, and services. In general, the limited resources can be viewed as service entities. That is, service entities provide the services requested by the service managers, in response to requests from carlets.

Figure 11:
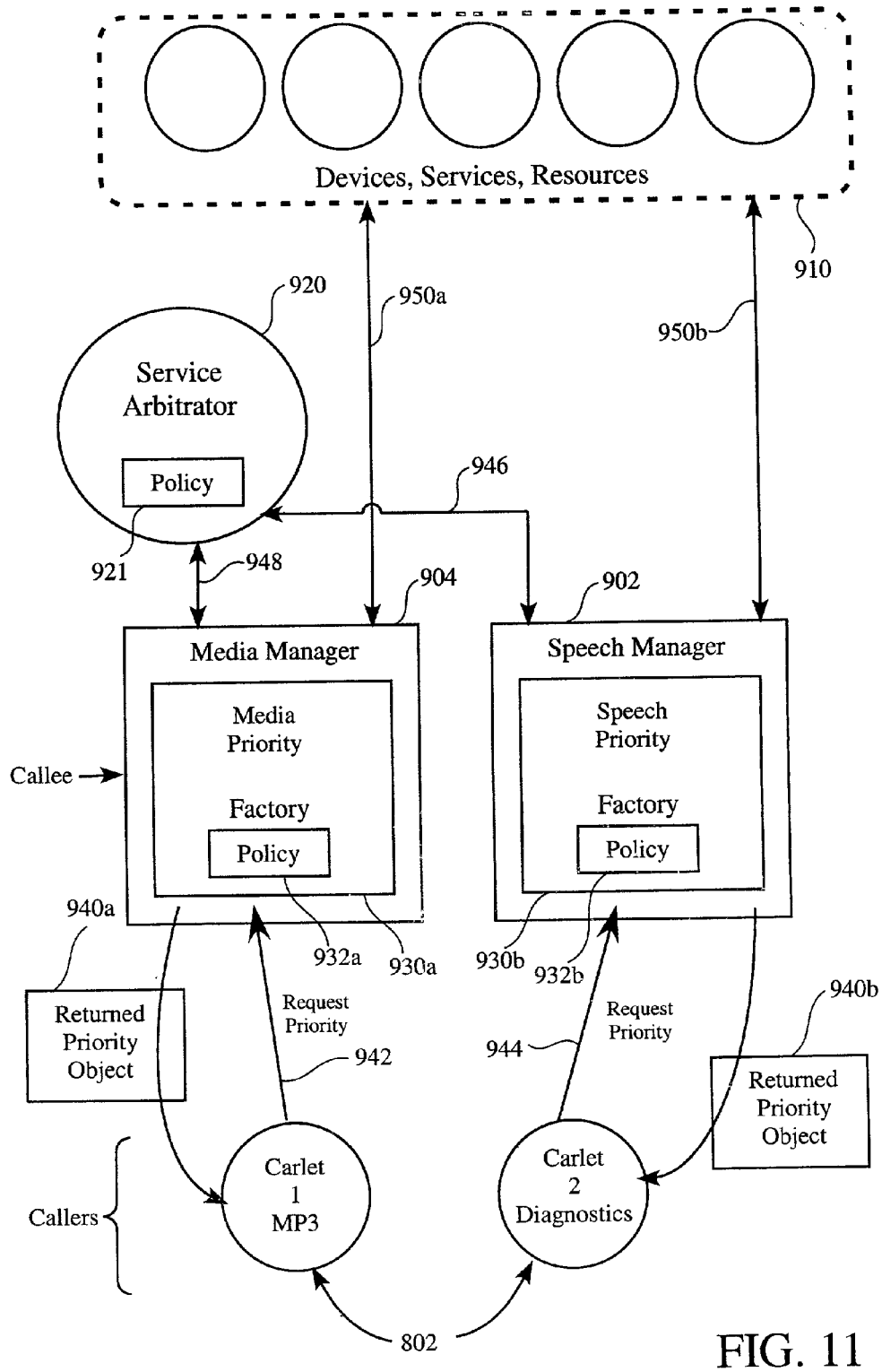
FIG. 11 illustrates a block diagram of the service arbitrator providing arbitration services to the media manager and the speech manager, in accordance with one embodiment of the present invention.

FIG. 11 illustrates a block diagram of the service arbitrator 920 providing arbitration services to the media manager 904 and the speech manager 902, for example. In this illustration, assume that carlet 1 802 is an MP3 carlet that will request access to the media manager 904 to play an MP3 file. Assume further that carlet 2 is a diagnostics carlet that manages system type events of a particular vehicle. The media manager 904 will have an associated media priority factory 930a, and the speech manager will have its own speech priority factory 930b. To prevent callers from creating their own priorities with the highest level of priority possible, priority factories specific to each manager are created. In this manner, carlets can't just create their own priorities without restriction.

In a preferred embodiment, the priority factory is a Java interface which managers 900 implement. When a caller (i.e. carlet) wants to access a particular service or device 910, the carlet must first call the manager's priority factory. The priority factory will then receive the requested priority level from the carlet. Based on certain criteria, the priority factory will return a priority object with a given priority back to the requesting caller (i.e. carlet). The priority object received by the carlet may or may not be the same level of priority initially requested of the particular priority factory.

In some cases, a higher priority is requested, yet a lower priority is returned in the priority object depending upon whether other carlets having higher priority currently have access of the requested device 910. Accordingly, it is up to the priority factory implementer to decide what priority to grant to specific callers (i.e. carlets).

Continuing with the drawing of FIG. 11, a specific example will now be discussed. As mentioned above, assume carlet 1 wants to play an MP3 file. Carlet 1 will initially call 942, the media priority factory 930*a* (interface of the media manager), to request a priority level of 5. For purposes of this example, assume that "0" has the highest priority level and that "10" is the lowest priority level. Of course, this scale can be changed depending on the granularity desired. Next, assume that the media manager's priority factory 930*a* decides that the priority level is O.K., and will thus return a media priority object 940*a* which contains a priority level of 5.

At this point, carlet 1 will pass the media priority object back to the media manager 904 in its request to play the file, along with all of the other parameters required to play the MP3 file. The media manager 904 will then determine that it needs speakers for output. As discussed above, speakers may be one of the devices 910. The media manager 904 will then make a request through a communication 948 to the service arbitrator 920 to use the speakers, passing to the service arbitrator 920 the media priority object 940*a* (containing the priority) of carlet number 1.

The service arbitrator 920 will then check to see if the speakers are being used by some other manager or the media manager 904 itself. Since the speakers are not being used, the service arbitrator 920 will grant the request made by the media manager 904. The media manager 904 will then make use of the speakers 910 to play the MP3 file.

At this point, the MP3 file is being played and the user of the vehicle is enjoying music being managed by the client telematics system. Now, carlet 2, which is a diagnostics carlet, will determine that the oil is dangerously low in the engine. The diagnostics carlet will therefore need to let the driver know to pull over and turn off the engine to prevent damage.

Carlet 2 will therefore generate a request for priority 944 to the speech priority factory 930*b*, the request being priority of "0" ("0" being the highest level of priority). In this embodiment, it is assumed that only system level code will get priority levels of zero, and the priority factory will create a speech priority object 940*b* that will be returned to carlet 2. The diagnostics carlet 2 will then make a call to the speech manager 902, passing to it the priority object 940*b* and the text which it wants spoken to the driver. The speech manager 902 will then make a call to the service arbitrator 920 to determine if the speakers are available, passing to it the priority object 940*b* it received from carlet 2.

The service arbitrator 920 will then check the priority from the speech manager and it will compare it to the priority from the media manager. As the media manager was provided with a priority level of 5, and the speech manager was provided with a priority level of 0, it will be determined that the speech manager 902 will have higher priority for to speakers that are part of 910.

The service arbitrator 920 will make a call 948 to the media manager to notify it that the media manager 904 needs to give up the use of the speakers. Then, the media manager 904 will communicate to carlet 1 to inform it that it needs to stop sending data for the currently playing MP3 file or files. The media manager will then clean up from using the speakers and release the speakers for use by others. The media manager 904 will let the service arbitrator 920 know that it has stopped using the speakers when appropriate.

Now, the service arbitrator 920 will inform the speech manager 902 that it can use the speakers as requested. The speech manager 902 will then use the speakers to provide the text to speech message to alert the driver/user that the vehicle must be pulled over and the engine stopped before damage occurs. In some cases, it is required that a service needs more than one service or device to carry out its tasks. For example, a Navigation carlet may require both speech input and output. In this case, the Navigation carlet would call the Speech Manager for both input and output and the Speech Manager would determine that it needs both the microphone and speakers. Accordingly, it would need both devices to function. If both devices were not available, then the carlet would be asked to wait until both are available, unless it has priority to override the use by other services.

Another example is where Service A might be using the microphone with a priority of 5. Service B might be using the speakers with a priority of 2. Service C might want to use both the microphone and speakers with a priority of 3. Service C has a higher priority than Service A, but not Service B. Since it needs both devices, but cannot gain access to the speakers, it will not be granted access to any of the devices.

When a service cannot get access due to a lower priority, the service can register to be notified when the devices and services are available. The service arbitrator 920 will send an event to the registrant when the devices and services are available.

As shown in FIG. 11, policies are in two places: (a) priority factories (e.g., 932*a*, 932*b*); and (b) service arbitrator (e.g., 921). The policy in the priority factory allows it to determine how to grant priorities. The policy in the service arbitrator 920 determines how it should grant device and service access based on requested priority. For example, a policy may state that speech manager 902 requests get a priority bump over other services when requesting the speakers, since it interacts with the user, and may need to interact with the user. In this example, a media manager 904 priority of 3 would be equivalent to a speech manager 902 priority of 5.

As used herein a carlet is a Java application. For each function or task to be processed on the client side or between the client and server sides, a carlet is invoked to manage the operation. In this manner, carlets can be independently written, tested, and launched for use on a telematics system. By way of example, a carlet can be written to control or monitor the activity of automobile components (e.g., tires, engine oil, wiper activity, steering tightness, maintenance recommendations, air bag control, transmission control, etc.). A carlet can be written to control or monitor applications to be processed by the telematics control unit (TCU) and interacted with using the on-board automobile monitor. As such, specialized carlets can be written to control the audio system, entertainment modules, such as on line games or movies, voice recognition, telecommunications, email communications (text and voice driven), etc. Accordingly, the type of carlets that can be written is unlimited. Carlets may be preinstalled or downloaded from a server. A carlet may or may not have an API which may be invoked by other carlets. The carlet may or may not have running threads of its own.

In practice, system carlets most likely will be written by the automobile manufacturer, who will be most knowledgeable of critical vehicle component operation, while non-vehicle system carlets can be written by independent software companies. Each carlet may therefore, in one embodiment, be associated with a set of properties. These properties, among other things, will dictate what minimum level of bandwidth should be provided by the communications framework.

As an overview, the Java virtual machine (JVM) is used as an interpreter to provide portability to Java applications. In general, developers design Java applications as hardware independent software modules, which are executed by Java virtual machines. The Java virtual machine layer is developed to operate in conjunction with the native operating system of the particular hardware on which the communications framework 516c is to run. In this manner, Java applications (e.g., carlets) can be ported from one hardware device to another without requiring updating of the application code.

Unlike most programming languages, in which a program is compiled into machine-dependent, executable program code, Java classes are compiled into machine independent byte-code class files which are executed by a machine-dependent virtual machine. The virtual machine provides a level of abstraction between the machine independence of the byte-code classes and the machine-dependent instruction set of the underlying computer hardware. A class loader is responsible for loading the byte-code class files as needed, and an interpreter or just-in-time compiler provides for the transformation of byte-codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "bytecode". The bytecode is then converted (interpreted) into machine code at runtime. Upon finding a Java applet, the Web browser invokes a Java interpreter (Java Virtual Machine), which translates the bytecode into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Although the present invention is described based on the Java programming language, other programming languages may be used to implement the embodiments of the present invention, such as other object oriented programming languages. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. A class defines a type of object that typically includes both instance variables and methods for the class. An object class is used to create a particular instance of an object. An instance of an object class includes the variables and methods defined for the class. Multiple instances of the same class can be created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

An object is a generic term that is used in the object-oriented programming environment to refer to a module that contains related code and variables. A software application can be written using an object-oriented programming language whereby the program's functionality is implemented using objects. Examples of object-oriented programming languages include C++ as well as Java.

Furthermore the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the TCU discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for managing access to service entities to enable use of the service entities under control of a plurality of computer applications to render a plurality of services that require the same first one of the service entities, a first of the computer applications consisting of a vehicle application to perform a non-emergency-warning service as the first service, the first service entity consisting of a vehicle component for performing the non-emergency-warning service for a driver of the vehicle, a second of the computer applications consisting of a vehicle-emergency-warning application to perform a vehicle-emergency-warning service as the second service, the vehicle component to be used by the vehicle-emergency-warning application to perform the vehicle-emergency-warning service to warn the vehicle driver of an urgent vehicle problem with respect to the vehicle; the method comprising the operations of:

a first requesting of a first priority level, the first requesting being by the first application for rendering the first service, the first requesting being made to a first service manager that is specific to managing only the first service;

a second requesting of a second priority level, the second requesting being by the second application for rendering the second service, the second requesting being made to a second service manager that is specific to managing only the second service;

a first returning, the first returning being of a first priority object with a first assigned priority level, the first returning of the first priority level being by a first priority factory, the first priority factory being specific to the first service manager, the first returning being in response to the requesting of the first priority level, the first assigned priority level having a first value according to the importance of the first service relative to the importance of the second service;

a second returning, the second returning being of a second priority object with a second assigned priority level, the second returning being by a second priority factory, the second priority factory being specific to the second service manager, the second returning being in response to the second requesting, the second assigned priority level having a second value according to the importance of the second service relative to the importance of the first service;

a first making of a request, the first making requesting the first requested service from the first service manager, the first making being by the first application, the first making including data for carrying out the first service, the first making including the first priority object;

first identifying the first service entity as being required to carry out the first service, the first identifying being by the first service manager that is specific to managing only the first service;

a third requesting of access to the first service entity, the third requesting being by the first service manager, the third requesting including the returned first priority object, the returned first priority object including the first assigned priority level representing the priority of the first application for rendering the first service using the first service entity;

first determining that the first service entity is not in-use;

first granting access to the first service entity for the first application to control rendering the first service using the first service entity;

a second making of a request, the second making requesting the second service from the second service manager, the second making being by the second application, the second making including data for carrying out the second service, the second making including the second priority object;

second identifying the first service entity as being required to carry out the second service, the second identifying being by the second service manager that is specific to managing only the second service;

a fourth requesting of access to the first service entity, the fourth requesting being by the second service manager, the fourth requesting end including the returned second priority object, the fourth requesting including the second assigned priority level representing the priority of the second application for rendering the second service using the first service entity;

comparing the first value to the second value, the first value being of the first priority level that is in-use and under control of the first application with respect to the first service entity, the second value being of the second priority level requested to be in-use by the second application with respect to the first service entity for the second service;

a second determining that the first value exceeds the second value;

second granting of the request of the first making of a request, the second granting commanding the first application to continue rendering the first service using the first service entity and commanding the second application to not render the second service using the first service entity during the continued use;

a third determining that the first value is less than the second value;

discontinuing the rendering of the first service using the first service entity; and third granting of the request of the second making of a request, the granting commanding the second application to render the second service using the first service entity.

2. A method as recited in claim 1, wherein each service manager is taken from the group consisting of a communications manager, a speech manager, a media manager, a user interface manager, and a telephony manager.

3. A method as recited in claim 1, wherein:
the first of the computer applications is a vehicle entertainment application to perform an entertainment service in the vehicle as the non-emergency-warning service that is the first service;
the first service entity consisting of the vehicle component is an audio speaker for playing audio entertainment for the driver of the vehicle;
the second of the computer applications is a vehicle diagnostics application to perform the vehicle-emergency-warning service as the second service;
the first service entity consisting of the vehicle component is the audio speaker also to be used by the vehicle diagnostics application to perform the vehicle-emergency-warning service to warn the vehicle driver of an urgent vehicle diagnostic problem with respect to the vehicle;
the importance of the first entertainment service relative to the importance of the second vehicle-emergency-warning service is such that the first priority factory that is specific to the first service manager returns the first priority level having the first value that is less than the second value of the second priority level returned by the second priority factory that is specific to the second service manager;
the discontinuing operation discontinues the rendering of the first entertainment service using the audio speaker; and
the third granting operation commands the vehicle diagnostics application to render the vehicle-emergency-warning service using the audio speaker as the first service entity.

4. A method as recited in claim 3, wherein:
each priority factory operates according to a first policy based on the importance of the respective service relative to the other services; and
the second and third determining operations operate according to a second policy based on the relative importance of the first and second values of the respective first and second priority levels of the requested respective specific first and second services.

5. A method as recited in claim 3, wherein the operation of second granting commands the vehicle entertainment application to render the first entertainment service using the audio speaker upon the discontinuing of the rendering of the second vehicle-emergency-warning service using the audio speaker.

6. A method as recited in claim 1, wherein:
the operations of first and second requesting of a priority level may request one value of the respective priority level; and
the operations of first and second returning of a priority object with an assigned priority level may each return the assigned priority level having a value different from the requested one value so that the respective assigned priority level embodied in the respective priority object is according to the importance of the respective requested service relative to the importance of all of the other ones of the services.

7. A method as recited in claim 1, wherein:
in the first identifying operation the first service manager identifies a plurality of service entities as being required to perform the first service; and
the operation of first determining that the first service entity is not in-use makes the first determining with respect to all of the plurality of service entities and determines that none of the plurality of service entities is in use; and
the first granting operation grants access to all of the plurality of service entities for performing the first service upon a determination that each of the plurality of service entities is not in use.

8. A method as recited in claim 7, wherein:
the first making of a request operation requesting the first service from the first service manager includes the first priority level of the first value, and the first value is applicable to all of the plurality of service entities required to carry out the first service;
the second making of a request operation identifies use of all of the plurality of service entities as being required to perform the second service;
the second making of a request operation includes the second assigned priority level of the second value, and the second value is applicable to all of the plurality of service entities required to carry out the second service;
the operation of third determining that the first value is less than the second value makes the determination with respect to the second value applicable to each of the plurality of service entities identified by the second service manager;
the operation of discontinuing discontinues the use of the first service entity to render the first service; and
the third granting operation commands the second application to render the second service using all of the plurality of service entities.

9. A method for managing access to service entities to enable use of the service entities under control of a plurality of computer applications to render a plurality of services that require the same first one of the service entities, a first of the computer applications consisting of a vehicle application to perform the first service, the first service entity consisting of a vehicle component for performing the first service for a driver of the vehicle, a second of the computer applications consisting of a vehicle-emergency-warning application to perform a vehicle-emergency-warning service as the second service, the vehicle component to be used also by the vehicle-emergency-warning application to perform the vehicle-emergency-warning service to warn the vehicle driver of an urgent vehicle problem with respect to the vehicle; the method comprising the operations of:
a first requesting of a first priority level, the first requesting being by the first application for rendering the first service, the first requesting being made to a first service manager that is specific to managing only the first service for the driver of the vehicle;
a first returning, the first returning being of a first priority object with a first assigned priority level, the first returning of the first priority level being by a first priority factory, the first priority factory being specific to the first service manager, the first returning being in response to the requesting of the first priority level, the first assigned priority level having a first value according to the importance of the first service relative to the importance of the second vehicle-emergency-warning service;

a first making of a request, the first making requesting the first requested service from the first service manager, the first making being by the vehicle application, the first making including data for carrying out the first service, the first making including the first priority object;

first identifying the first service entity as being required to carry out the first service, the first identifying being by the first service manager that is specific to managing only the first service;

a second requesting of access to the first service entity, the third requesting being by the first service manager, the third requesting including the returned first priority object, the returned first priority object including the first assigned priority level representing the priority of the first application for rendering the first service using the first service entity;

performing the first service using the first service entity, the performing being in response to the second requesting, the performing being by the vehicle application;

a third requesting of a second priority level, the third requesting being by the second application for rendering the second vehicle-emergency-warning service, the third requesting being made to a second service manager that is specific to managing only the second vehicle-emergency-warning service to warn the driver;

a second returning, the second returning being of a second priority object with a second assigned priority level, the second returning being by a second priority factory, the second priority factory being specific to the second service manager, the second returning being in response to the third requesting, the second assigned priority level having a second value according to the importance of the second vehicle-emergency-warning service relative to the importance of the first service;

a second making of a request, the second making requesting the second vehicle-emergency-warning service from the second service manager, the second making being by the second application, the second making including data for carrying out the second vehicle-emergency-warning service, the second making including the second priority object;

second identifying the first service entity as being required to carry out the second vehicle-emergency-warning service, the second identifying being by the second service manager that is specific to managing only the second vehicle-emergency-warning service to warn the driver;

a fourth requesting of access to the first service entity, the fourth requesting being by the second service manager, the fourth requesting including the returned second priority object, the fourth requesting including the second assigned priority level representing the priority of the second application for rendering the second vehicle-emergency-warning service using the first service entity;

comparing the first value to the second value, the first value and the second value being as returned in the respective first and second returning operations;

determining that the first value is less than the second value;

commanding the vehicle application to discontinue using the first service entity to render the first service; and granting of the request of the fourth requesting of access to the first service entity, the granting commanding the vehicle-emergency-warning application to render the second vehicle-emergency-warning service using the first service entity.

10. A method as recited in claim 9, further comprising the operation of:

registering the first service to be notified when the first service entity is available after the vehicle-emergency-warning application renders the second vehicle-emergency-warning service.

11. A method as recited in claim 9, wherein:

in the first identifying operation the first service manager identifies a plurality of service entities as being required to perform the first service;

the first making of a request operation includes the first priority level of the first value applicable to all of the plurality of service entities required to carry out the first service;

the performing operation performs the first service using the plurality of service entities, the performing being in response to the second requesting and being by the vehicle application;

the second identifying operation identifies use of at least one of the plurality of service entities as being required to perform the second vehicle-emergency-warning service;

the commanding operation commands the vehicle application to discontinue using all of the plurality of service entities to render the first service; and the granting operation commands the vehicle-emergency-warning application to render the second vehicle-emergency-warning service using the at least one of the plurality of service entities.

* * * * *